United States Patent [19]
Josephson

[11] Patent Number: 5,819,236
[45] Date of Patent: Oct. 6, 1998

[54] SYSTEM AND METHOD FOR PROVIDING ADVANCE NOTIFICATION OF POTENTIAL PRESENTMENT RETURNS DUE TO ACCOUNT RESTRICTIONS

[75] Inventor: Stanley M. Josephson, Dallas, Tex.

[73] Assignee: Carreker-Antinori, Inc., Dallas, Tex.

[21] Appl. No.: 489,227

[22] Filed: Jun. 12, 1995

[51] Int. Cl.$^6$ ........................................... G06F 17/30
[52] U.S. Cl. ................... 705/35; 707/1; 705/1; 705/42
[58] Field of Search ............... 235/375; 382/137; 395/245, 603, 606, 244, 239; 707/1, 35, 42

[56] References Cited

U.S. PATENT DOCUMENTS 5,237,159 8/1993 Stephens .................................. 235/379

OTHER PUBLICATIONS

Technology News (Nov. 16, 1992, p. 3 vol. 157, No. 220).
Phillips Business Info (Nov. 25, 1992, V. 15, No. 24).
EET Report, vol. 15, No. 24, p. 7(1).
Payments and Transactions http:www.financetech.comb/db_area/archives 2/bst/96070120.htm.
What's in numbers http.//www.banking.com/aba/techtopics.htm.
Talking the Pulse of Texas Check Fraud http/www.financetech.com/db_area/archives 2/bst/1994/9409102.htm.
Bank get behind ECP by Reselling Network http/www.financetech.com/db_area/archives/2bst/1994/94020102.

*Primary Examiner*—Thomas G. Black
*Assistant Examiner*—Diane Mizraki
*Attorney, Agent, or Firm*—Hitt Chwang & Gaines, P.C.

[57] ABSTRACT

An electronic system and method for providing advance notification of a potential return that may occur when a presenting financial institution ("FI") eventually presents an item for payment to a paying FI in a subsequent paper-based presentment process. The system includes: (1) data capture circuitry for capturing item data from the item, the data including an FI account number field corresponding to an FI account upon which the item is to be drawn, (2) a database containing eligibility criteria and FI restricted account data corresponding to restricted FI accounts of the paying FI and (3) comparison circuitry for comparing the FI account number field with the eligibility criteria to determine whether the item data are eligible for matching with the FI restricted account data and, if the item data are so eligible, matching the FI account number field with the FI restricted account data to allow the electronic system to provide advance notification to the sending FI of the potential return by the paying FI to allow the sending FI to take appropriate protective action with respect to the item in anticipation of the return.

20 Claims, 3 Drawing Sheets

SYSTEM AND METHOD FOR PROVIDING ADVANCE NOTIFICATION OF POTENTIAL PRESENTMENT RETURNS DUE TO ACCOUNT RESTRICTIONS

TECHNICAL FIELD OF THE INVENTION

The present invention is directed, in general, to computer systems for processing financial transactions and, more specifically, to a computer system, including a database of restricted financial institution ("FI") accounts, for providing advance notification of the return of unpaid checks that may occur when a sending FI eventually presents an item for payment to a paying FI in a subsequent paper-based presentment or electronic check presentment ("ECP") process. The system allows the sending FI to take appropriate protective action with respect to the item in anticipation of the return or, preferably, in lieu of subjecting the item to the presentment process.

BACKGROUND OF THE INVENTION

For some time, financial institutions ("FIs"), primarily comprising banks, have handled the transfer and presentment of items, often largely comprising checks, for payment in a manual, paper-based fashion. At specified times each day, "sending" FIs sort all checks presented to them from depositors and other correspondent FIs into bundles, with the bundles containing checks for the particular FIs on which they are drawn ("drawee" or "paying" FIs). As the bundles of checks are sorted for particular paying FIs, they are segregated into batches of about 300 checks according to their American Banking Association ("ABA") assigned routing/transit numbers ("R/Ts"). One or more of these batches are then aggregated for shipment to the paying FI. A detail listing of all checks within the batch and a cover letter are attached to each shipment of checks and summarize the contents of the batch. Such summary information comprises the name of the paying FI, the preassigned R/T associated with the name of the paying FI, the number of checks in the shipment and the total dollar amount of all of the checks in the batch. The cover letter is termed a "cash letter." The sending FI then transfers by physical transportation means, to the paying FI, the cash letter and the bundles of checks.

When the paying FI receives the cash letter, it verifies that the contents of the cash letter, i.e., the check amounts, balance with the totals contained on the cover letter. After a check processing function and posting process, the paying FI determines whether the account on which each check is drawn is restricted in any way.

Accounts may be restricted for a variety of reasons. For instance, an account may be closed for cause, closed, dormant or new. The account holder may be deceased. The paying bank may order that no debits or transactions be posted or may order an officer restriction. There may be a lien on the account or the account holder may have placed a stop payment on file. Alternatively, the account may be restricted to a limited valid check number range or due to suspicious activity. In contrast with return of an item by reason of insufficient funds in an account, restrictions are placed on accounts regardless of the amount of any item presented.

Once the paying FI has determined that the account is not restricted, the paying FI determines whether enough money exists in the account on which the item is drawn to cover payment of the check (sufficient funds). Based on these determinations, the paying FI either accepts or rejects payment of the check, slating the check for return. The paying FI then notifies the sending FI regarding any balancing discrepancies or any items that are to be returned. The return is accomplished by physical transportation of the returned check to the sending FI that originally accepted the check.

A typical instance in which this paper-based presentment and routing process occurs is when, for example, an FI depositor receives a check from another party that is drawn on an FI other than the depositor's FI and the depositor presents the check to the depositor's own FI for payment, either in cash immediately or by crediting the depositor's account as a deposit. For the depositor's FI to collect on the check presented by the depositor, the depositor's FI (the sending FI or "FI of first deposit") "presents" the check to the paying FI for deduction from the account of the drawer of the check. In this role, the sending FI becomes the "presenting" FI. Once the paying FI receives and processes the check, it essentially pays the amount of the check to the sending FI through a settlement process. In this role, the paying FI is legally referred to as the "payor" FI. Additionally, in terms of the delivery of items presented to the paying FI by a presenting FI for payment, the paying FI may be referred to as the "receiving" FI.

The procedure described above is an over-simplification of the process established for clearing checks between FIs. However, it is sufficient to demonstrate the problems associated with such a process. A first problem resulting from the above process is the delay between the time a check is first deposited at the sending FI and the time the paying FI accepts or rejects the check. The sending FI has the choice of either placing a hold on the depositor's FI account until it is notified of acceptance by the paying FI or it pays out the money to the sending FI and incurs the risk that the check will be rejected by the paying FI as an unpaid check, perhaps because it is drawn on a restricted account.

Many FIs choose not to incur such a risk and therefore place a hold on the depositor's FI account until it is notified that the check has been accepted and paid, i.e., debited to the paying FI's account. However, the time that it takes for the sending FI to be notified that a check has been accepted or rejected may take as long as 7 to 10 days. The Expedited Funds Availability Act of 1987, however, places limits on the length of time that an FI may retain a hold on a depositor's funds. In most cases, only two days are allowed for local items and only three days for non-local items. These time limits can severely expose an FI to risks of loss and fraud by forcing an FI accepting depositors' deposits to release funds to those depositors prior to verification that those funds are, in fact, collectable from the paying FI.

To overcome the problem of delay, FIs have attempted to automate the process of gathering checks into cash letters, sending and receiving cash letters and reconciling these cash letters against their contents. Such attempts at automation have included the installation of check sorter machines that scan checks at very high speeds and sort these checks into separate bundles associated with each paying FI. Conventional check processing methods employed by most U.S. FIs and other financial institutions now process checks and credits using high speed reader/sorter equipment such as IBM 3890's or Unisys DP1800's. The sorter "reads" information contained on the checks such as the R/T, the FI depositor's account number, the check serial number and the amount of the check. This information is contained in a line of symbols at the bottom of each check in Magnetic Ink Character Recognition ("MICR") form in a font called E13B. After reading and validation, the equipment transfers such information through data processing means to electronic data storage devices. Check sorter machines have been used quite successfully and are well known in the art.

Another attempt at automating the check process is the use of computer systems to record and manage the information associated with the check sorting procedure. Such computer systems interface with the check sorter machines and allow the computer systems to build database information associated with each check that is read. This allows an operator of a computer system to obtain information on checks that have been read such as the total number of checks drawn on specific FIs and the total dollars of all checks drawn on specific FIs. Such systems that accomplish this task are the IBM Check Processing Control System ("CPCS") and the Unisys Item Processing System ("IPS").

Although both of the above attempts have benefitted the industry, they have failed to address the problem of delays associated with both the transfer of cash letters between FIs and the notification of acceptance or non-payment of a check. Better transportation, overnight express and other services have helped to improve the physical transfer of cash letters, but the transfer of the information contained in the cash letters has still been dependent on the physical delivery of the cash letters to each of the paying FIs. Such dependence on the physical transfer of the cash letters perpetuates the delay associated with acceptance or non-payment of particular checks.

Ser. No. 08/236,632, filed on Apr. 29, 1994 and now U.S. Pat. No. 5,691,524, entitled "Improved Electronic Check Presentment System Having a Non-ECP Exceptions Notification System Incorporated Therein," commonly assigned with the present invention and incorporated herein by reference is directed, in particular, to an improved electronic check processing system and data processing apparatus that incorporates a system for providing early electronic check return notifications arising from non-electronic check presentment exceptions. The system establishes an electronic version of the cash letter that precedes the paper version through the presentment process to the paying FI. If the paying FI "returns" an item, an electronic indication of that "return" is reflected back to the sending FI, preferably prior to submission of the paper item to the paper-based presentment process. Thus, the system employs ECP to provide early warning to allow a sending FI to avoid the subsequent paper-based presentment process and to institute defensive, preventive, remedial or corrective (together, "protective") action to prevent release of uncollected deposited funds to the depositor.

To improve today's check processing procedures still further, what is needed in the art is a system for storing data concerning a number of FIs' restricted accounts. The system should then be able to detect when a check, or other item the sending FI receives from a depositor, is drawn on an account that a paying FI has restricted for one reason or another and provide advance notification of the potential return to the sending FI so that it may take appropriate protective action. The system should preferably allow such early notification of a potential return without requiring submission of the specific item in question to a paper-based presentment process or even to ECP.

SUMMARY OF THE INVENTION

To address the above-discussed deficiencies of the prior art, it is a primary object of the present invention to provide electronic advance notification to a sending FI of returns or other problems that may occur in a subsequent paper-based presentment process to allow the sending FI to take appropriate protective action on behalf of their depositor.

In the attainment of the above primary object, one aspect of the present invention provides an electronic system and method for providing advance notification of a potential return that may occur when a sending FI eventually presents an item for payment to a paying FI in a subsequent paper-based presentment process. The system includes: (1) data capture circuitry for capturing item data from the item, the data including an FI account number field corresponding to an FI account upon which the item is to be drawn, (2) a database containing eligibility criteria and FI restricted account data corresponding to restricted FI accounts of the paying FI and (3) comparison circuitry for comparing the FI account number field with the eligibility criteria to determine whether the item data are eligible for matching with the FI restricted account data and, if the item data are so eligible, matching the FI account number field with the FI restricted account data to allow the electronic system to provide advance notification to the sending FI of the potential return by the paying FI to allow the sending FI to take appropriate protective action with respect to the item, in anticipation of the return.

Accordingly, the present invention introduces a system that maintains a database of FI restricted account data, preferably from a plurality of FIs. As the sending FI receives and captures item data from items, the item data are checked against the FI restricted account data to determine whether the item is drawn on an FI account that the relevant paying FI has restricted for one reason or another. The present invention not only gives a forewarning of potential returns but may also allow the sending FI, at its option, to avoid having even to submit the item to presentment to the paying FI through the paper-based or ECP process, thereby saving significant time and money.

"Database," as the term is used herein, is defined to include both a single physical database and multiple physical databases. In the case of multiple physical databases, the databases may be located at one or more physical facilities. In fact, in the embodiment to be described in detail, the eligibility criteria and FI restricted account data are contained in separate physical databases located at separate physical facilities, although such criteria and data can be advantageously contained in a single physical database located at a single physical facility.

In a preferred embodiment of this aspect of the present invention, the data capture circuitry comprises magnetic ink detection circuitry for reading the item data (MICR item data, in this case) from the item. Those of ordinary skill in the art are familiar with MICR and its use in reading item data from checks and other items that the sending FI receives from its depositors. Alternatively, the item data may be captured by machine vision, manually or by other suitable techniques.

In a preferred embodiment of this aspect of the present invention, the electronic system further comprises an all items file comprising the item data, data pertaining to an account number of a depositor presenting the item to the sending FI and an amount of an associated deposit. Those of ordinary skill in the art are familiar with the term "all items file." The present invention preferably operates with an "all items file," although it is not necessary that the account number of the depositor presenting the item and the amount of the deposit be employed.

In a preferred embodiment of this aspect of the present invention, the eligibility criteria include a list of participating paying FIs that have contributed restricted account numbers and restriction reason codes. This allows the system of the present invention to be employed by a number of participating paying FIs. If a paying FI does not wish to participate in the system, its R/T number or other identifying data are not included in the eligibility criteria.

In a preferred embodiment of this aspect of the present invention, the database further contains data masks to filter the FI account number field. The data masks allow, for example, validation of account numbers or selection of specific accounts or ranges of accounts that are eligible for participation. Of course, such data masks are not necessary to the broad scope of the present invention.

In a preferred embodiment of this aspect of the present invention, the database contains eligible depositor inclusion information and type of depositor notification required. Although this information is not necessary, it allows the present invention to limit notification to selected depositors and to tailor the manner in which notification is given to the selected depositors.

In a preferred embodiment of this aspect of the present invention, the database includes global restrictions. Global restrictions, such as those concerning forged checks, are preferably added to the database for access by all users.

In a preferred embodiment of this aspect of the present invention, the item data ineligible for matching with the FI restricted account data correspond to items selected from the group consisting of: (1) money orders, (2) travelers checks, (3) official FI checks, (4) dividend checks, (5) government warrant checks, (6) postal money order checks, (7) rebate checks and (8) return item checks. Either the accounts on which these items are drawn are not generally subject to restriction or restrictions are handled in a different way from ordinary items, such as personal or business checks.

In a preferred embodiment of this aspect of the present invention, the comparison circuitry tests the FI account number field for: (1) length errors, (2) non-standard format and (3) unreadable digits. The present invention therefore preferably allows the FI account number field to be verified. This ensures that the FI account number field is accurate prior to being compared with the FI restricted account data.

In a preferred embodiment of this aspect of the present invention, the electronic system further comprises a matched items file containing the FI account number field matching the account data, a restriction reason code and a notification selection code indicating a type of notification requested. This matched items file provides one means by which the sending FI may receive a report of any potential presentment problems concerning the item, allowing the sending FI to take the appropriate protective action.

In a preferred embodiment of this aspect of the present invention, the database further contains restriction reason codes corresponding to the FI restricted account data, the restriction reason codes selected from the group consisting of: (1) closed for cause, (2) closed, (3) dormant, (4) deceased, (5) post no debits, (6) post no transactions, (7) officer restriction, (8) lien, (9) new account, (10) stop payment on file, (11) stop payment check number range and (12) suspicious activity. These and other restriction reason codes preferably detail to the sending FI the nature of the potential return, allowing the sending FI to tailor its protective action.

In a preferred embodiment of this aspect of the present invention, the electronic system further comprises circuitry for generating a report containing the potential return. This report may take the form of the matched items file, as described above, or another appropriate form, such as an interactive database or real-time alert. The report may be printed on paper or may be embodied in machine-readable form.

In the further attainment of the above primary object, another aspect of the present invention provides a method for providing such advance notification.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
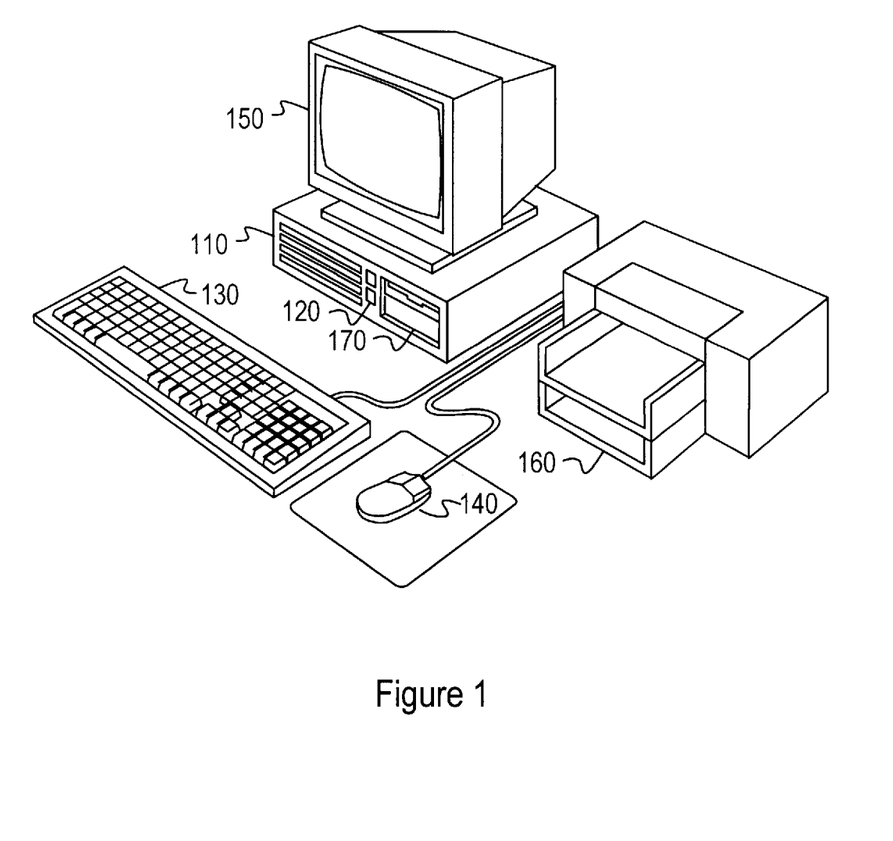
FIG. 1 illustrates an isometric view of a personal computer ("PC") that provides an environment within which the present invention may operate.

Referring initially to FIG. 1, illustrated is a PC 100 that provides an environment within which the present invention may operate. The PC 100 comprises a main chassis 110 containing computer system components to be illustrated and discussed in more detail with regard to FIG. 2. The main chassis 110 features, among other things, a reset button 120, a momentary switch used to signal a CPU and other components (e.g. memory and input/output ("I/O") controllers not shown in FIG. 1) within the PC 100 to reboot, thereby providing a means of rebooting the PC 100. Coupled through individual connectors on the main chassis 110 are a keyboard 130, a mouse 140 and a video monitor 150. The peripheral devices 130, 140, 150, 160 allow the PC 100 to interact with a user. FIG. 1 also shows a disk drive 170, allowing permanent storage of computer system data on magnetic media.

Figure 2:
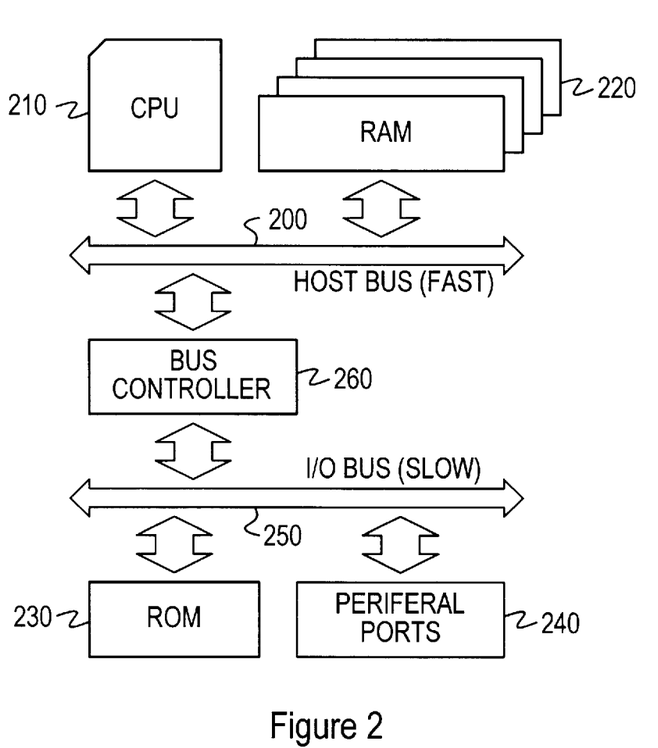
FIG. 2 illustrates a block diagram of components of the PC of FIG. 1 that provide an environment within which the present invention can operate.

Turning now to FIG. 2, illustrated is a block diagram of an architecture of the PC of FIG. 1 that serves as an environment within which the present invention can operate. Specifically, the architecture is embodied in electronic components that reside within the main chassis 110 of FIG. 1.

Shown is a host bus 200. Coupled to the host bus 200 are a CPU 210 and random access memory ("RAM") 220. Of course, the CPU 210 may comprise more than one microprocessor acting in concert.

An I/O bus 250 is coupled to read-only memory ("ROM") 230 and peripheral ports 240. The peripheral ports 240 couple the I/O bus 250 to the peripheral devices 130, 140, 150, 160, 170 of FIG. 1 for communication therewith. Included among the peripheral ports 240 is a parallel port. Finally, a bus controller 260 couples the host bus 200 and the I/O bus 250 to provide a path for and manage communication therebetween. The host bus 200 is relatively fast to facilitate rapid communication between the CPU 210 and the RAM 220 and is burdened with as few components as possible to maximize its speed. The I/O bus 250 is allowed to run at a slower pace because its speed is less critical. Each of the lines of the buses 200, 250 require a drive current to carry signals thereon. Accordingly, the present invention operates in conjunction with a system controller that supplies the required drive current. Of course, the present invention can also function within an architecture that only has a single bus.

Those of ordinary skill in the art should realize that the PC 100 just described is cooperable with the processes, files and databases and various other machines, such as MICR readers, to be described more particularly below, to form the various types circuitry described and claimed herein. However, it should be understood that the present invention is not limited to embodiment in a PC. The present invention may be, in fact, more preferably embodied in computing equipment that has traditionally found more widely-accepted use in the banking industry, such as minicomputers or mainframe computers. The principles of operation of the present invention are, without regard to the class or type of associated computer system, fundamentally the same. The present invention may alternatively be implemented in firmware or in hardwired integrated circuits or discrete electronic components.

Figure 3:
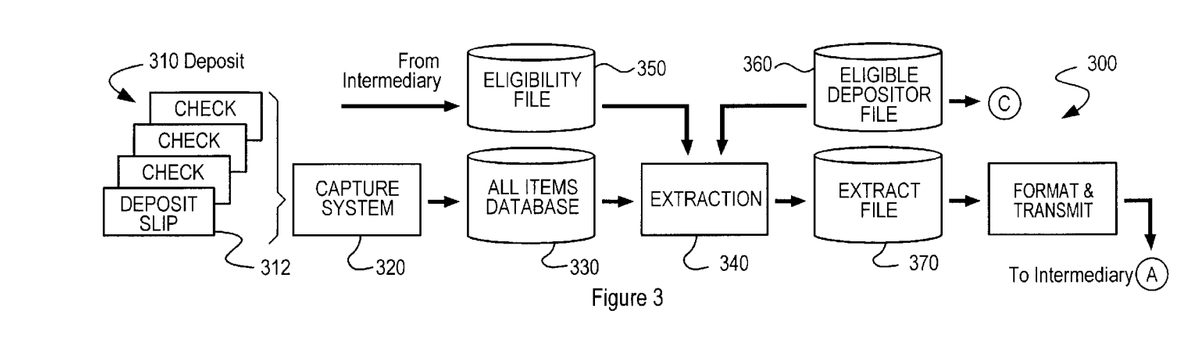
FIG. 3 illustrates a schematic block representation of a MICR capture and processing process, performed at a sending FI, in which the captured item data are compared to a database containing eligibility criteria and FI restricted account data corresponding to eligible FI depositor accounts and an extract file for transmission to an intermediary.

Turning now to FIG. 3, illustrated is a schematic block representation of a MICR capture and processing process (generally designated 300), performed at a sending FI, in which the captured item data are compared to a database containing eligibility criteria and FI restricted account data corresponding to eligible FI depositor accounts and an extract file for transmission to an intermediary.

"Intermediary," for purposes of the present invention, is defined as a central location, such as an electronic clearinghouse or data center, where extract files from a number of sending FIs are collected together and processed with restriction files from a number of paying FIS. In this centralized embodiment of the present invention, the comparison circuitry and FI restricted account database are split between the sending FI and the intermediary. This allows the present invention to be effected as a paid subscription service to the sending and paying FIs. However, it should be understood that an intermediary is not necessary. In a more distributed embodiment of the present invention, the FI restricted account database and the entire comparing process can take place at a single sending FI.

At this point, it is beneficial to describe the conventional, paper-based presentment process in somewhat greater detail, beginning with a deposit of items by a depositor with the sending FI. During the standard course of daily operations within a commercial bank, deposited items 310 are received from a variety of sources (for example, over-the-counter, drive-in depositories, automated teller machines ("ATMs"), mail or lockboxes). These deposited items 310 are accompanied by a deposit slip 312 that reflects the depositor's FI account number and the sum of the dollar amounts of the accompanying checks. These deposited items 310 are drawn on other FIs, but may also include checks drawn on the depositor's FI. These are called on-us deposited items.

In conventional systems for data capture, checks and credit slips are preconditioned for processing and are read through high speed reader/sorter machines 320 (included, along with optical or other mechanical or electrical data capturing machines, within the broader term: "data capture circuitry"), with groups of documents being processed in transaction sets. During this high speed capture process, the credit portion of the transaction set is first read and validated and information contained on the credit slip's MICR line is extracted and stored in a database. Then, the associated debits are read, validated, balanced to the credit slip and stored on the database as associated with the corresponding credit. The physical documents are microfilmed, a unique item sequence number ("ISN") is assigned and the documents are directed to a designated pocket of the reader/sorter as either "on us" for those items drawn on the FI performing the capture and sorting operations or as "transit" for those items drawn on all other FIs.

The transit items are directed to multiple pockets corresponding to the specific FI on which the check was drawn, i.e., the paying FI, to a correspondent of the paying FI or to specific Federal Reserve Districts or cities according to pre-defined tables called sort patterns. The segregated checks are then wrapped with a computer-printed detail list and cash letter covering report for each group of checks and the groups are dispatched via ground or air transportation to the other FIs for further processing. This group of like-destination checks is commonly referred to as a cash letter.

When ECP means are used, the MICR code line information that has been extracted from the checks is used to prepare electronic files for early data transmission to the other FIs and the physical groups of checks and their listings and cash letters are dispatched at a later time.

During the high speed capture process, a database is created on the host computer that contains the data extracted from each item's MICR code line. This database is referred to as an "all items file" 330. The all items file 330 preferably contains the following fields for each item processed.

from a credit slip:
        depositor's account number;
        deposit amount;
        deposit process control;
        deposit auxiliary on-us;
        deposit item sequence number and
        deposit out-of-balance indicator.
    from a check:
        account number;
        check amount;
        check process control;
        check auxiliary on-us or check number;
        check item sequence number and
        check R/T.

The present invention employs this all items file 330 as a database from which eligible detail items are extracted in an extraction process 340 to provide an early determination of whether an item is drawn on a restricted account and warns the sending FI of that fact, most preferably before the sending FI submits the item to presentment, whether ECP or paper-based.

Upon completion of the extraction process, the extracted file is further processed in a processor to exclude those items not eligible for further processing. The eligibility criteria are based on the comparison of an eligibility file 350 downloaded preferably daily to the sending FI from the intermediary. The eligibility file 350 preferably contains fields pertaining to the R/T of eligible paying FIs and the specific account numbers or ranges of account numbers that are eligible for participation.

In addition to the data elements, the eligibility file 350 contains one or more format data masks that define the specific characteristics of the account number field on the extracted items. The data masks preferably include such information as the length and structure of the account number. Account numbers that do not meet the criteria specified by the eligibility file 350 are deleted. Some categories of extracted items that preferably do not meet the criteria based on the eligibility file 350 are:

money orders;

travelers checks;

official FI checks;

dividend checks;

government warrant checks;

postal money order checks;

rebate checks or return item checks.

Either the accounts on which these items are drawn are not generally subject to restriction or restrictions are handled in a different manner from items subject to the ordinary presentment process, such as personal or business checks. Other categories of extracted items that may not meet the criteria based on the eligibility file 350 are:

missing account number;

length errors (account number);

non-standard formats (account number) or multiple unreadable digits.

Thus, the present invention therefore preferably allows the FI account number field to be verified. This ensures that the FI account number field is accurate prior to being compared with the FI restricted account data.

Another file, maintained by the processor, is also used for exclusion purposes. This file, an eligible depositor file 360, is used further to screen depositors whose deposited checks are not eligible for further processing, for example, downstream correspondent FIs who do not wish to participate in the service. If a paying FI does not wish to participate in the system, its R/T or other identifying data are not included in the eligibility criteria. This eligibility test is based on the depositor's account number.

The eligible depositor file 360 is also used to determine the categories of unpaid items for which the depositor has selected to receive notification and the type of notification requested. The eligible depositor file 360 preferably includes fields pertaining to:

depositor's account number;

minimum dollar limit;

depositor selection code preferably selected from the group comprising:

notification required on all items, notification to be sent by facsimile, notification to be sent by printed hard-copy report, notification by telephone, and image notification and depositor's name and address.

After the filtering process is complete, an extract file 370 is formatted and transmitted. The extract file 370 contains only those checks eligible for further processing, along with a code that denotes the specified type of notification the depositor has requested. The extract file 370 is then formatted into a standard format and transmitted to an intermediary processor where the following functions are performed.

Figure 4:
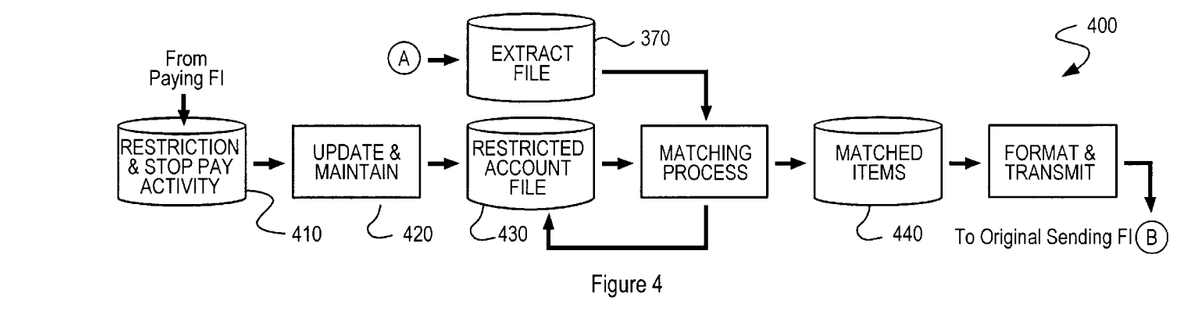
FIG. 4 illustrates a schematic block representation of a comparison or matching process, performed at the intermediary (as defined below), in which the extract file of FIG. 3 is compared with FI restricted account data from various FIs to produce a matched items file for transmission back to the sending FI.

Turning now to FIG. 4, illustrated is a schematic block diagram of a comparison or matching process (generally designated 400), performed at the intermediary, in which the extract file 370 of FIG. 3 is compared with FI restricted account data from various FIs to produce a matched items file for transmission back to the sending FI.

The extract file 370 is matched against a file that has been previously stored by the intermediary. This file is called the "restricted account file" 430 and is initially created and subsequently maintained (by a process 420) by the receipt of account restriction and stop payment activity 410 from the participating paying FIs' non-monetary input to their demand deposit or related systems, such as stop payment, account reconcilement or positive pay (depositor check issue files) systems. The restricted account file 430 may alternatively be created or maintained from the extraction of restriction activity from the paying FI's demand deposit system. The following general types of restrictions are used in the matching process 400 and such coded information is used to create and maintain the account restriction file 430 preferably containing fields pertaining to:

R/T of the paying FI;

restriction reason code:

closed for cause account, closed (other), dormant, deceased, post no debits, post no transactions, officer restriction, lien, new account, stop payment on file (amount), stop payment on file (amount and serial number), stop payment (check number range) and suspicious activity;

date restriction first placed;

date last updated;

restriction expiration date and transaction type:

add, change, or delete.

The above-described and other restriction reason codes preferably detail to the sending FI the nature of the potential return, allowing the sending FI to tailor its protective action.

The system preferably further provides a cross-reference table for each paying FI that equates specific restriction reason codes used in their systems to a standard set of restriction reason codes. This allows for standardization of restriction reason codes, facilitating subsequent report generation at the sending FI. Other types of global restrictions, such as those concerning forged checks, are preferably added to the file by the intermediary for access by all users.

During the intermediary's matching process 400, a comparison is made between the extraction file 370 and the account restriction file 430. Extracted items that match are placed in a database of matched transactions for the sending FI that supplied the extraction file 370. The intermediary updates the account restriction file 430 with the current date and a count for each time a match occurred.

Upon completion of the match process for each FI, the file of matched transactions (a "matched items file") 440 is formatted for transmission back to the sending FI. The matched items file 440 preferably contains at least the FI account number field matching the account data, the restriction reason code and a notification selection code indicating a type of notification requested. The matched items file 440 provides one means by which the sending FI may receive a report of any potential presentment problems concerning the item, allowing the sending FI to take the appropriate protective action. The matched items file 440 preferably includes fields containing the following information:

from a deposited item:
  check R/T,
  check account number,
  check amount,
  check process control,
  check auxiliary on-us or check number and
  check item sequence number;
from a depositor slip:
  depositor account number
  deposit amount,
  deposit process control,
  deposit auxiliary on-us,
  deposit item sequence number and
  deposit out-of-balance indicator;
restriction reason code;
restriction reason description and
type of depositor notification required.

Figure 5:
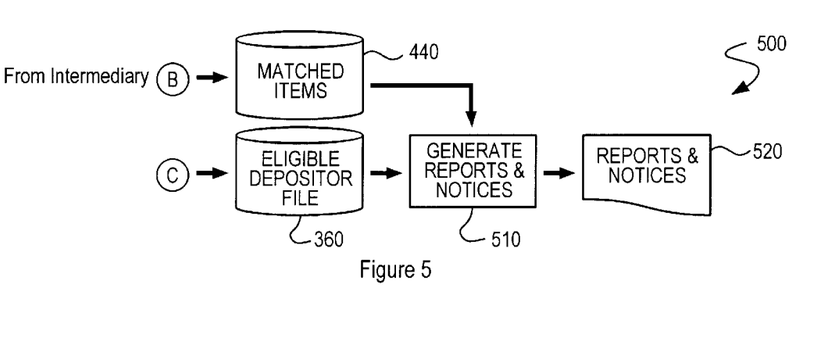
FIG. 5 illustrates a schematic block representation of a report generation process, performed at the sending FI, for creating a report of any potential return of unpaid checks.

Turning now to FIG. 5, illustrated is a schematic block diagram of a report generation process (generally designated 500), performed at the sending FI, for creating a report of any potential return of unpaid checks. The matched items file 440, when received, is used to generate (in a process 510) a report or other files 520 adapted to interface to other systems of the sending FI to place temporary holds against the depositor's account and to notify the depositor of such action. This report may simply take the form of the matched items file 440, as described above, or another appropriate form, such as an interactive database or real-time alert. The report may be printed on paper or may be embodied in machine-readable form.

From the above, it is apparent that the present invention provides an electronic system and method for providing advance notification of a potential return that may occur when a sending FI eventually presents an item for payment to a paying FI in a subsequent paper-based presentment process. The system includes: (1) data capture circuitry for capturing item data from the item, the data including an FI account number field corresponding to an FI account upon which the item is to be drawn, (2) a database containing eligibility criteria and FI restricted account data corresponding to restricted FI accounts of the paying FI and (3) comparison circuitry for comparing the FI account number field with the eligibility criteria to determine whether the item data are eligible for matching with the FI restricted account data and, if the item data are so eligible, matching the FI account number field with the FI restricted account data to allow the electronic system to provide advance notification to the sending FI of the potential return by the paying FI to allow the sending FI to take appropriate protective action with respect to the item in anticipation of the return.

Although the present invention and its advantages have been described in detail, those skilled in the art should understand that they can make various changes, substitutions and alterations herein without departing from the spirit and scope of the invention in its broadest form.

What is claimed is:

1. An electronic system for providing advance notification of a potential return that may occur when a presenting financial institution (FI) eventually presents an item for payment to a paying FI in a subsequent paper-based presentment process, comprising:
  data capture circuitry for capturing item data from said item, said data including an FI account number field corresponding to an FI account upon which said item is to be drawn;
  a database containing eligibility criteria and FI restricted account data corresponding to restricted FI accounts of said paying FI, said restricted account data including restriction reason codes selected from the group consisting of:
    closed for cause,
    closed,
    dormant,
    deceased,
    post no debits,
    post no transactions,
    officer restriction,
    lien,
    new account,
    stop payment on file,
    stop payment check number range, and
    suspicious activity; and
  comparison circuitry for comparing said FI account number field with said eligibility criteria to determine whether said item data are eligible for matching with said FI restricted account data and, if said item data are so eligible, matching said FI account number field with said FI restricted account data to allow said electronic system to provide advance notification to said presenting FI of said potential return by said paying FI, said advance notification including said restriction reason codes that allow said presenting FI to take appropriate protective action with respect to said item in anticipation of said return.

2. The electronic system as recited in claim 1 wherein said data capture circuitry comprises magnetic ink detection circuitry for reading said item data from said item.

3. The electronic system as recited in claim 1 further comprising an all items file comprising said item data, data pertaining to an account number of a depositor presenting said item to said presenting FI and an amount of an associated deposit.

4. The electronic system as recited in claim 1 wherein said eligibility criteria include a list of participating paying FIs that have contributed restricted account numbers and restriction reason codes.

5. The electronic system as recited in claim 1 wherein said database further contains data masks to filter said FI account number field.

6. The electronic system as recited in claim 1 wherein said database contains eligible depositor inclusion information and type of depositor notification required.

7. The electronic system as recited in claim 1 wherein said item data ineligible for matching with said FI restricted account data correspond to items selected from the group consisting of:
  money orders, travelers checks, official FI checks, dividend checks, government warrant checks, postal money order checks, rebate checks, and return item checks.

8. The electronic system as recited in claim 1 wherein said comparison circuitry tests said FI account number field for:

missing account number, length errors, non-standard format, and unreadable digits.

9. The electronic system as recited in claim 1 further comprising a matched items file containing said FI account number field matching said account data, a restriction reason code and a notification selection code indicating a type of notification requested.

10. The electronic system as recited in claim 1 further comprising circuitry for generating a report containing said potential return.

11. A method for providing advance notification of a potential return that may occur when a presenting financial institution (FI) eventually presents an item for payment to a paying FI in a subsequent paper-based presentment process, comprising the steps of:

capturing item data from said item, said data including an FI account number field corresponding to an FI account upon which said item is to be drawn;

comparing said FI account number field with eligibility criteria to determine whether said item data are eligible for matching with FI restricted account data, said restricted account data including restriction reason codes selected from the group consisting of:

closed for cause, closed, dormant, deceased, post no debits, post no transactions, officer restriction, lien, new account, stop payment on file, stop payment check number range, and suspicious activity; and if said item data are so eligible, matching said FI account number field with said FI restricted account data to provide advance notification to said presenting FI of said potential return by said paying FI, said advance notification including said restriction reason codes that allow said presenting FI to take appropriate protective action with respect to said item in anticipation of said return.

12. The method as recited in claim 11 further comprising the step of reading said item data from said item with magnetic ink detection circuitry.

13. The method as recited in claim 11 wherein said step of capturing comprises the step of creating an all items file comprising said item data, data pertaining to an account number of a depositor presenting said item to said presenting FI and an amount of an associated deposit.

14. The method as recited in claim 11 wherein said eligibility criteria include a list of participating paying FIs that have contributed restricted account numbers and restriction reason codes.

15. The method as recited in claim 11 wherein said database further contains data masks, said method further comprising the step of filtering said FI account number field with said data masks.

16. The method as recited in claim 11 wherein said database contains eligible depositor inclusion information and type of depositor notification required.

17. The method as recited in claim 11 wherein said item data ineligible for matching with said FI restricted account data correspond to items selected from the group consisting of:

money orders, travelers checks, official FI checks, dividend checks, government warrant checks, postal money order checks, rebate checks, and return item checks.

18. The method as recited in claim 11 wherein said step of comparing comprises the step of testing said FI account number field for:

missing account number, length errors, non-standard format, and unreadable digits.

19. The method as recited in claim 11 further comprising the step of producing a matched items file containing said FI account number field matching said account data, a restriction reason code and a notification selection code indicating a type of notification requested.

20. The method as recited in claim 11 further comprising the step of generating a report containing said potential return.

* * * * *